(12) United States Patent
Heo et al.

(10) Patent No.: US 8,730,578 B1
(45) Date of Patent: May 20, 2014

(54) SUNLIGHT COUPLER AND SUNLIGHT SYSTEM COMPRISING THEREOF

(71) Applicant: Electronics and Telecommunications Research Institute, Daejeon (KR)

(72) Inventors: Young Soon Heo, Gwangju (KR); Hyun Seo Kang, Gwangju (KR); Young Sun Kim, Daejeon (KR); Hyoung Jun Park, Gwangju (KR); Kwon-Seob Lim, Gwangju (KR); Keo-Sik Kim, Gwangju (KR); Eun Kyoung Jeon, Gwangju (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 13/782,150

(22) Filed: Mar. 1, 2013

(30) Foreign Application Priority Data

Nov. 8, 2012  (KR) ......................... 10-2012-0125889

(51) Int. Cl.
*G02B 17/00* (2006.01)
(52) U.S. Cl.
USPC .......................................... 359/591; 359/598
(58) Field of Classification Search
USPC .................................. 359/591–592, 597–598
See application file for complete search history.

(56) References Cited

U.S. PATENT DOCUMENTS

| 4,297,000 | A | * | 10/1981 | Fries | 353/3 |
| 4,389,085 | A | * | 6/1983 | Mori | 359/591 |
| 4,411,490 | A | * | 10/1983 | Daniel | 126/648 |
| 4,500,167 | A | * | 2/1985 | Mori | 385/31 |
| 6,057,504 | A | * | 5/2000 | Izumi | 136/246 |

FOREIGN PATENT DOCUMENTS

| KR | 10-0989670 B1 | 10/2010 |
| KR | 10-2011-0125494 A | 11/2011 |
| KR | 20-2011-0010816 U | 11/2011 |
| KR | 10-1100082 B1 | 12/2011 |

OTHER PUBLICATIONS

Shiraishi et al. Light-Propogation Characteristics in Thermally Diffused Expanded Core Fibers, Journal of Lightwave Technology, vol. 11, No. 10, Oct. 1993.*

* cited by examiner

*Primary Examiner* — Christopher Mahoney
(74) *Attorney, Agent, or Firm* — Rabin & Berdo, P.C.

(57) ABSTRACT

A sunlight coupler is provided, the sunlight coupler may include a beam integrator configured to concentrate beams of sunlight, which may be incident from a plurality of optical fibers, in the form of a single beam, a triplet lens focusing the concentrated beam on a specific position, and an optical fiber provided for transmission of the focused sunlight. The optical fiber may be a thermally-diffusion expand core fiber.

9 Claims, 3 Drawing Sheets

SUNLIGHT COUPLER AND SUNLIGHT SYSTEM COMPRISING THEREOF

CROSS-REFERENCE TO RELATED APPLICATIONS

This U.S. non-provisional patent application claims priority under 35 U.S.C. §119 to Korean Patent Application No. 10-2012-0125889, filed on Nov. 8, 2012, in the Korean Intellectual Property Office, the entire contents of which are hereby incorporated by reference.

BACKGROUND OF THE INVENTION

Example embodiments of the inventive concept relate to a sunlight system, and in particular, to a sunlight coupler configured to transmit solar light concentrated through an optical fiber without loss.

Due to recent rising oil prices, economical and eco-friendly renewable energy has been actively developed. Especially, a solar daylighting technology is being actively researched to realize a natural lighting.

The solar daylighting technology can be realized using a reflective mirror system, a prism system, an optical pipe system, a heliostat system, or an optical fiber daylighting system. However, the reflective mirror system, the optical pipe system, and the heliostat system can be utilized, only when they have been provided in design and construction stages of a building, and further, they may suffer from high maintenance cost.

The optical fiber daylighting system may be configured to transmit concentrated solar light to a desired position using optical fibers. Due to the use of the optical cables, the optical fiber daylighting system does not have a limitation in terms of a transmission distance and installation. Accordingly, the optical fiber daylighting system does not need to be designed before its construction.

For all that, the more the optical fiber in an optical cable, the higher the construction cost of the system, because the optical cable to be used in the optical fiber daylighting system is expensive.

SUMMARY

Example embodiments of the inventive concept provide a sunlight coupler configured in such a way that the number of optical fibers to be provided in an optical cable can be reduced, and a sunlight system with the same.

Other example embodiments of the inventive concept provide a sunlight coupler, whose installation cost can be reduced, and a sunlight system with the same.

According to example embodiments of the inventive concepts, a sunlight system may include a condenser configured to condense sunlight, a sunlight coupler outputting the condensed sunlight from the condenser in the form of a single beam, and a sunlight utilizing device, in which the output solar light may be used. The sunlight coupler may include a beam integrator configured to concentrate beams of the sunlight, which may be incident from a plurality of optical fibers, in the form of a single beam, a triplet lens focusing the concentrated beam on a specific position, and a thermally-diffusion expand core fiber provided for transmission of the focused sunlight.

In example embodiments, the condenser may include a plurality of lenses concentrating the sunlight, and a plurality of light concentrating devices transmitting beams of the sunlight transmitted from the lenses to the optical fibers, respectively.

In example embodiments, the triplet lens may include a first convex lens, a second convex lens, and a concave lens provided between the first and second convex lenses.

In example embodiments, the thermally-diffusion expand core fiber has an input terminal with an expanded core, thereby having an increased numerical aperture.

In example embodiments, the number of the thermally-diffusion expand core fiber provided in the sunlight coupler may be one.

According to example embodiments of the inventive concepts, a sunlight coupler may include a beam integrator configured to concentrate beams of sunlight, which may be incident from a plurality of optical fibers, in the form of a single beam, a triplet lens focusing the concentrated beam on a specific position, and an optical fiber provided for transmission of the focused sunlight. The optical fiber may be a thermally-diffusion expand core fiber.

In example embodiments, the triplet lens may include a first convex lens, a second convex lens, and a concave lens provided between the first and second convex lenses.

In example embodiments, the thermally-diffusion expand core fiber has an input terminal provided with an expanded core, thereby have an increased numerical aperture.

In example embodiments, the number of the thermally-diffusion expand core fiber provided in the sunlight coupler may be one.

BRIEF DESCRIPTION OF THE DRAWINGS

Example embodiments will be more clearly understood from the following brief description taken in conjunction with the accompanying drawings. The accompanying drawings represent non-limiting, example embodiments as described herein.

Figure 1:
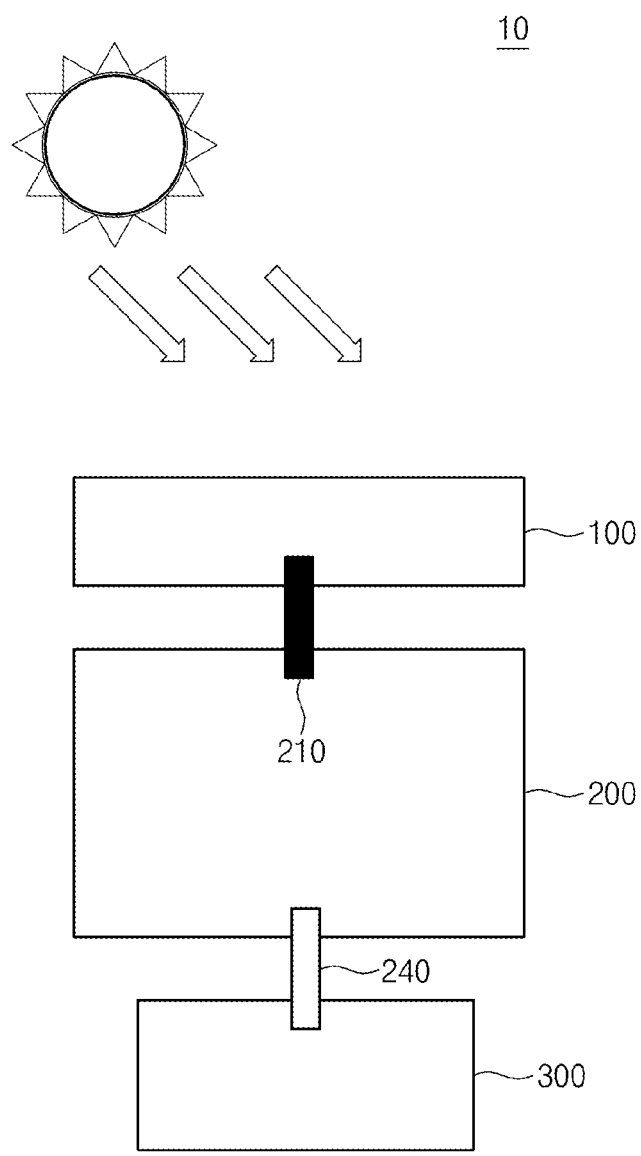
FIG. 1 is a diagram schematically illustrating a sunlight system according to example embodiments of the inventive concept.

It should be noted that these figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. For example, the relative thicknesses and positioning of molecules, layers, regions and/or structural elements may be reduced or exaggerated for clarity. The use of similar or identical reference numbers in the various drawings is intended to indicate the presence of a similar or identical element or feature.

DETAILED DESCRIPTION

Example embodiments of the inventive concepts will now be described more fully with reference to the accompanying drawings, in which example embodiments are shown.

Example embodiments of the inventive concepts may, however, be embodied in many different forms and should not be construed as being limited to the embodiments set forth herein; rather, these embodiments are provided so that this disclosure will be thorough and complete, and will fully convey the concept of example embodiments to those of ordinary skill in the art. In the drawings, the thicknesses of layers and regions are exaggerated for clarity. Like reference numerals in the drawings denote like elements, and thus their description will be omitted.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Like numbers indicate like elements throughout. As used herein the term "and/or" includes any and all combinations of one or more of the associated listed items. Other words used to describe the relationship between elements or layers should be interpreted in a like fashion (e.g., "between" versus "directly between," "adjacent" versus "directly adjacent," "on" versus "directly on").

It will be understood that, although the terms "first", "second", etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of example embodiments.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises", "comprising", "includes" and/or "including," if used herein, specify the presence of stated features, integers, steps, operations, elements and/or components, but do not preclude the presence or addition of one or more other features, integers, steps, operations, elements, components and/or groups thereof.

Example embodiments of the inventive concepts are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments of the inventive concepts should not be construed as limited to the particular shapes of regions illustrated herein but are to include deviations in shapes that result, for example, from manufacturing. For example, an implanted region illustrated as a rectangle may have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of example embodiments.

Unless otherwise defined, all terms (including technical and scientific terms) used herein have the same meaning as commonly understood by one of ordinary skill in the art to which example embodiments of the inventive concepts belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

FIG. 1 is a diagram schematically illustrating a sunlight system according to example embodiments of the inventive concept.

Referring to FIG. 1, a sunlight system 10 may include a condenser 100, a sunlight coupler 200, and a sunlight utilizing device 300.

The condenser 100 may be configured to concentrate sunlight onto a plurality of optical fibers. In example embodiments, the optical fibers may be provided in an optical fiber bundle 210. The condenser 100 may further include a direction-changing part for tracking the sun. The use of the direction-changing part enables to improve sunlight concentration efficiency of the condenser 100.

The sunlight concentrated by the condenser 100 may be transmitted the sunlight coupler 200 through the optical fiber bundle 210.

The sunlight coupler 200 may be configured to couple the sunlight transmitted from the optical fiber bundle 210 and transmit it into a single optical fiber 240 (e.g., a thermally-diffusion expand core (TEC) fiber). As a result, the sunlight coupler 200 enables to maximize optical coupling efficiency.

The sunlight transmitted from the sunlight coupler 200 into the optical fiber 240 may be output through the sunlight utilizing device 300.

The sunlight utilizing device 300 may be configured to utilize the sunlight from the optical fiber 240 for lighting application. However, in other embodiments, the sunlight utilizing device 300 may be configured to utilize the transmitted sunlight for sterilization and/or drying applications.

In order to reduce complexity in the drawings and to provide better understanding of example embodiments of the inventive concepts, FIG. 1 shows the condenser 100 singly connected to the sunlight coupler 200, but the number of the condenser 100 connected to the sunlight coupler 200 may be two or more.

As described above, the sunlight concentrated by a plurality of optical fibers can be transmitted to a single optical fiber through the sunlight coupler 200. This use of the sunlight coupler 200 enables to reduce the number of expensive optical cables in the sunlight system, FIG. 2 is a diagram schematically illustrating a condenser according to example embodiments of the inventive concept.

Figure 2:
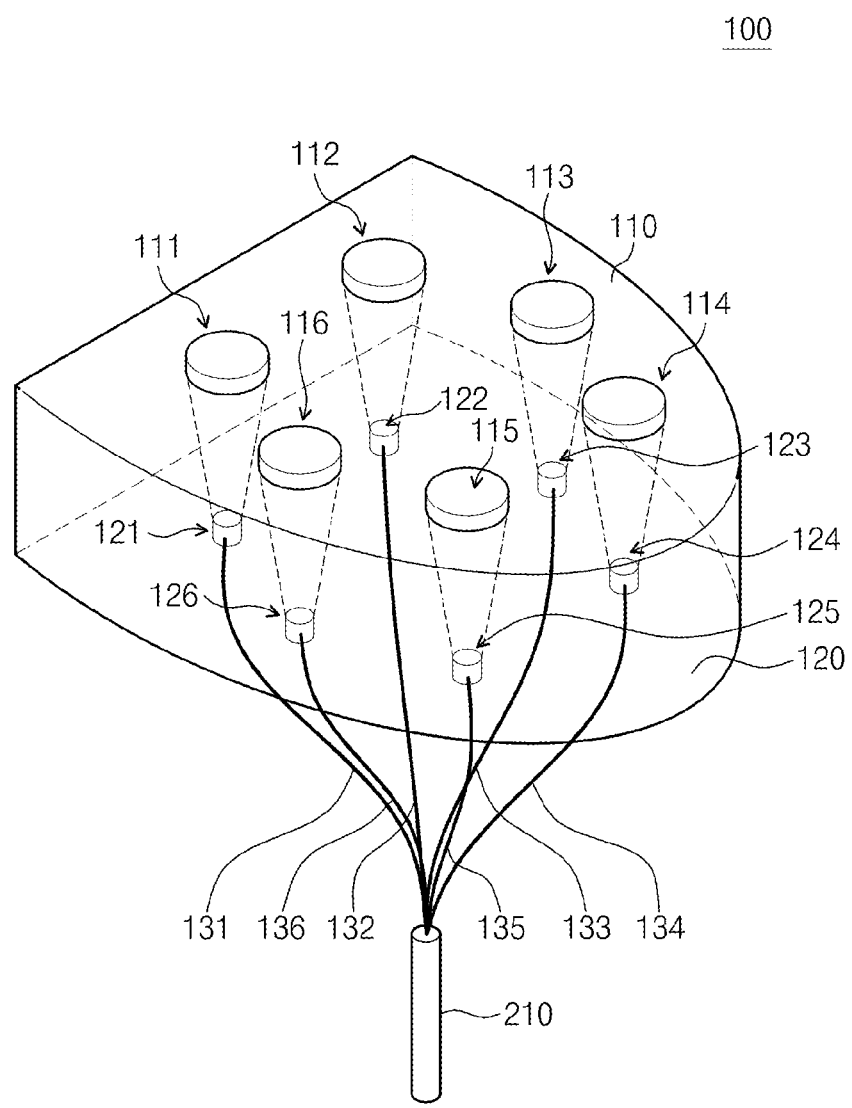
FIG. 2 is a diagram schematically illustrating a condenser according to example embodiments of the inventive concept.

Referring to FIG. 2, the condenser 100 may include a light shaft board 110, a light concentrating board 120, and optical fibers 131, 132, 133, 134, 135, and 136.

The light shaft board 110 may be configured to include a plurality of lenses 111, 112, 113, 114, 115, and 116. The lenses 111-116 may be provided on a surface of the light shaft board 110, and each of them may be configured to deliver the sunlight incident thereto into the corresponding one of the optical fibers 131-136.

The light concentrating board 120 may include a plurality of light concentrating devices 121, 122, 123, 124, 125, and 126, each of which is connected to the corresponding one of the optical fibers 131-136. Here, the light concentrating devices 121-126 may be provided at focal points of the lenses 111-116. Further, the light concentrating devices 121-126 may be connected to the optical fibers 131-136, respectively, to transmit the sunlight to the optical fibers 131-136.

The optical fibers 131-136 may be configured to output the transmitted sunlight to the sunlight coupler 200. The plurality of the optical fibers 131-136 may be grouped to constitute the optical fiber bundle 210.

In example embodiments, the sunlight incident to the first lens 111 may be delivered to the first light concentrating device 121. The sunlight concentrated to the first light concentrating device 121 by the first lens 111 may be delivered to the sunlight coupler 200 through the first optical fiber 131 connected to the first light concentrating device 121. Similarly, other lenses 112-116 may also be used to deliver the sunlight incident thereto to the corresponding optical fibers 132-136, respectively, through the corresponding light concentrating devices 122-126.

The condenser 100 will not be limited to the structure depicted in FIG. 2. In other words, the condenser 100 may be configured to have the structure exemplarily shown in FIG. 2, but its structure may be variously modified.

Figure 3:
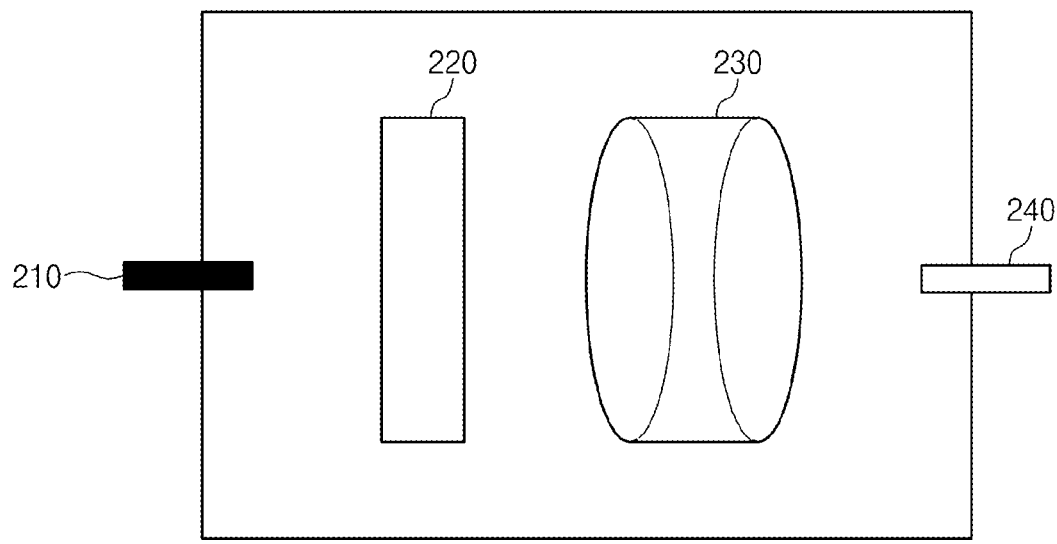
FIG. 3 is a diagram schematically illustrating a sunlight coupler according to example embodiments of the inventive concept.

FIG. 3 is a diagram schematically illustrating a sunlight coupler according to example embodiments of the inventive concept.

Referring to FIG. 3, the sunlight coupler 200 may include the optical fiber bundle 210, a beam integrator 220, a triplet lens 230, and the optical fiber 240.

The optical fiber bundle 210 may include a plurality of optical fibers, which may be configured to output the sunlight concentrated by the condenser 100. Here, the optical fiber bundle 210 with the optical fibers 131-136 may be provided between the condenser 100 and the sunlight coupler 200. Here, the optical fiber bundle 210 may constitute a part of the sunlight coupler 200, while other part thereof may constitute the condenser 100. By using the beam integrator 220, beams of the sunlight, which may be output from the optical fibers 131-136 of the optical fiber bundle 210, may be concentrated into a single solar light and be output.

The triplet lens 230 may be configured to focus the concentrated solar light onto the optical fiber 240.

The optical fiber 240 may be configured to deliver the concentrated solar light to the outside of the sunlight coupler 200 (e.g., the sunlight utilizing device 300). In example embodiments, the optical fiber 240 may be realized using a thermally-diffusion expand core fiber. Here, the beam integrator 220 and the triplet lens 230 may be configured to concentrate a plurality of beams of the sunlight, which are output from the optical fiber bundle 210, to a single solar beam. In this case, a size of the beam can be increased, and this may lead to a loss of the sunlight deteriorating the optical coupling efficiency, when the optical fiber 240 has the same numerical aperture as that of each optical fiber provided in the condenser 100. To avoid this problem, the optical fiber 240 may be provided in the form of a thermally-diffusion expand core fiber.

The thermally-diffusion expand core fiber may include an optical fiber core, in which additives may be diffused by a thermal treatment, and the core of the optical fiber is expanded to increase a numerical aperture of the optical fiber.

The sunlight system according to example embodiments of the inventive concept may be configured to include the sunlight coupler 200 provided with the thermally-diffusion expand core fiber, and thus, it is possible to reduce the number of the expensive optical cable. Accordingly, a long-distance transmission of the sunlight may be realized through the single optical fiber without loss.

Figure 4:
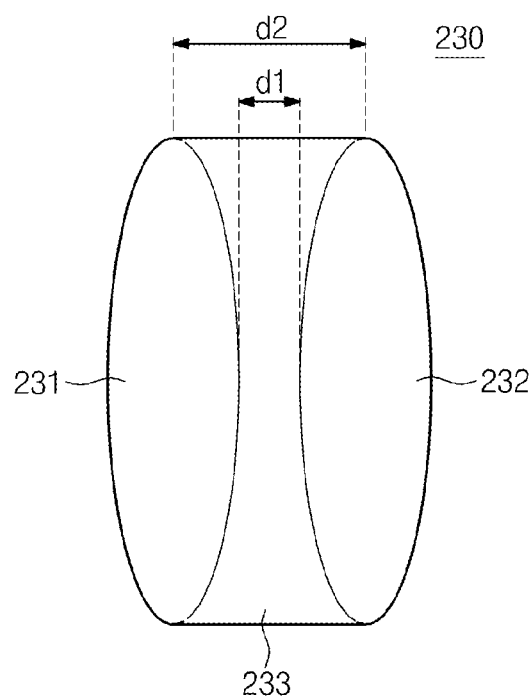
FIG. 4 is a diagram exemplarily illustrating a triplet lens of FIG. 3.

FIG. 4 is a diagram exemplarily illustrating a triplet lens of FIG. 3.

Referring to FIG. 4, the triplet lens 230 may include two convex lenses 231 and 232 and a concave lens 233.

The pair of the convex lenses 231 and 232 may be provided spaced apart from each other by a specific distance.

The concave lens 233 may be interposed between the pair of the convex lenses 231 and 232. The concave lens 233 may be formed in such a way that its edge thickness d2 is greater than its center thickness d1.

In the triplet lens 230, the convex lenses 231 and 232 may be jointed with the concave lens 233 to form a unified structure. The triplet lens 230 is able to reduce optical aberrations and preserve excellent optical characteristics of the system.

According to example embodiments of the inventive concept, even if the sunlight coupler 200 concentrates the sunlight using a plurality of optical fibers 131-136 in the optical fiber sunlight system 10 for a daylighting application, the single optical fiber 240 may be used to deliver the sunlight to a desired position. Accordingly, the sunlight coupler 200 is able to reduce installation cost for implementation of the sunlight system. Further, the optical fiber may have a core portion of an input terminal provided in the form of a thermally-diffusion expand core (TEC) fiber, thereby delivering the sunlight without loss.

According to example embodiments of the inventive concept, a sunlight coupler has a thermally-diffusion expand core fiber, of which core input terminal is configured to have an increased numerical aperture. This enables to transmit solar light to a desired position using a single optical fiber. In addition, the sunlight coupler can be installed with reduced cost, because the number of the optical fiber therein is one.

While example embodiments of the inventive concepts have been particularly shown and described, it will be understood by one of ordinary skill in the art that variations in form and detail may be made therein without departing from the spirit and scope of the attached claims.

What is claimed is:
1. A sunlight system, comprising:
a condenser configured to condense sunlight;
a sunlight coupler outputting the condensed sunlight from the condenser in the form of a single beam; and
a sunlight utilizing device, in which the output solar light is used,
wherein the sunlight coupler comprises:
a beam integrator configured to concentrate beams of the sunlight, which are incident from a plurality of optical fibers, in the form of a single beam;
a triplet lens focusing the concentrated beam on a specific position; and
a thermally-diffusion expand core fiber provided for transmission of the focused sunlight.

2. The sunlight system of claim 1, wherein the condenser comprises:
- a plurality of lenses concentrating the sunlight; and
- a plurality of light concentrating devices transmitting beams of the sunlight transmitted from the lenses to the optical fibers, respectively.

3. The sunlight system of claim 1, wherein the triplet lens comprises:
- a first convex lens;
- a second convex lens; and
- a concave lens provided between the first and second convex lenses.

4. The sunlight system of claim 1, wherein the thermally-diffusion expand core fiber has an input terminal with an expanded core, thereby having an increased numerical aperture.

5. The sunlight system of claim 1, wherein the number of the thermally-diffusion expand core fiber provided in the sunlight coupler is one.

6. A sunlight coupler, comprising:
- a beam integrator configured to concentrate beams of sunlight, which are incident from a plurality of optical fibers, in the form of a single beam;
- a triplet lens focusing the concentrated beam on a specific position; and
- an optical fiber provided for transmission of the focused sunlight,
- wherein the optical fiber is a thermally-diffusion expand core fiber.

7. The sunlight coupler of claim 6, wherein the triplet lens comprises:
- a first convex lens;
- a second convex lens; and
- a concave lens provided between the first and second convex lenses.

8. The sunlight coupler of claim 6, wherein the thermally-diffusion expand core fiber has an input terminal provided with an expanded core, thereby have an increased numerical aperture.

9. The sunlight coupler of claim 6, wherein the number of the thermally-diffusion expand core fiber provided in the sunlight coupler is one.

\* \* \* \* \*